March 31, 1970     C. O. GARDNER     3,503,188
AIR POLLUTION PREVENTION SYSTEM AND APPARATUS
Filed April 25, 1966
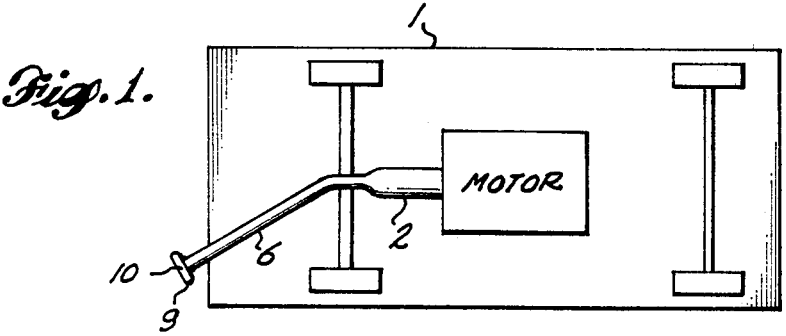
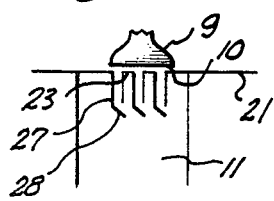
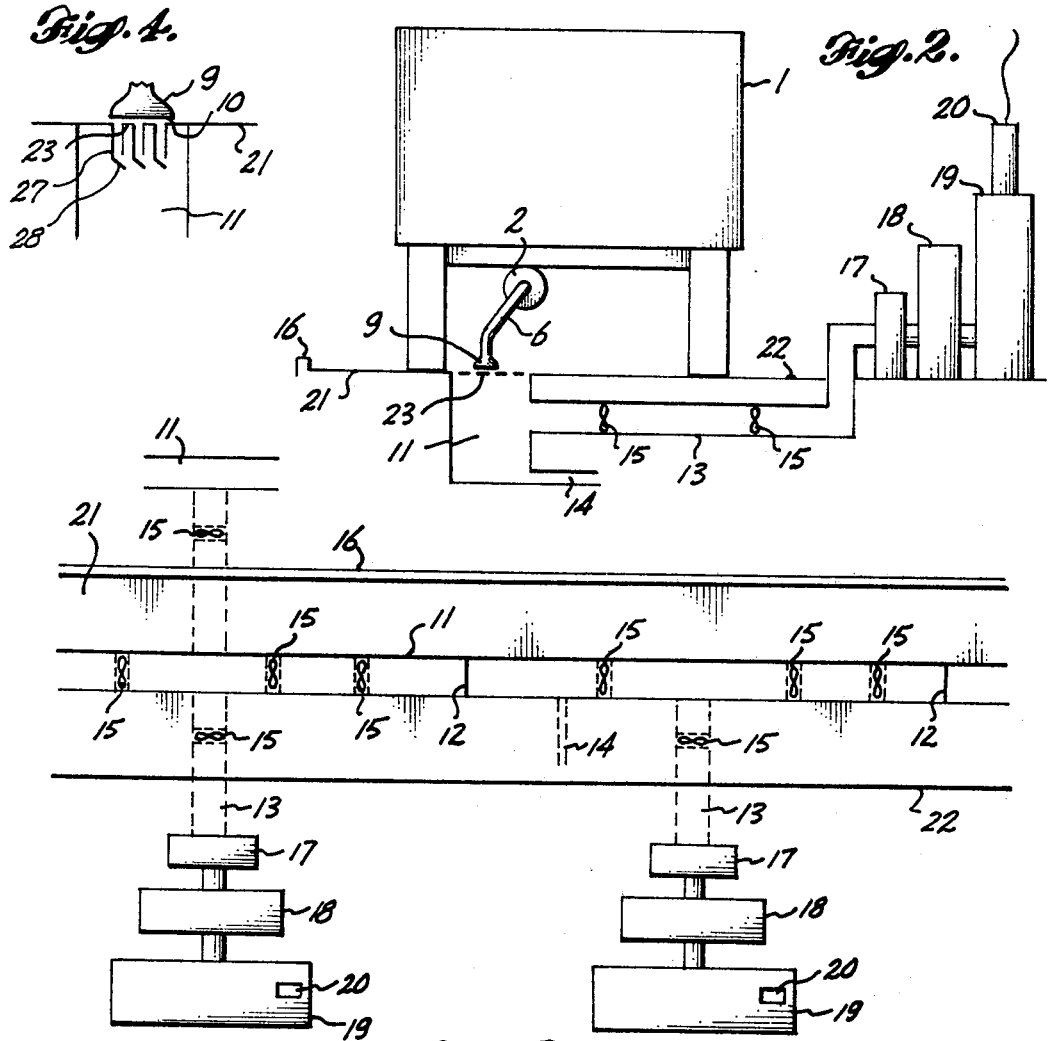
INVENTOR
Conrad O. Gardner

United States Patent Office 3,503,188
Patented Mar. 31, 1970

3,503,188
AIR POLLUTION PREVENTION SYSTEM
AND APPARATUS
Conrad O. Gardner, Hopewell, N.J.
(1329 NW. 20th St., Seattle, Wash. 98177)
Filed Apr. 25, 1966, Ser. No. 545,117
Int. Cl. B01d 53/34; A62b 15/00; B60r 27/00
U.S. Cl. 55—385                           3 Claims

ABSTRACT OF THE DISCLOSURE

A system for collecting and processing exhaust emissions from motor vehicles travelling on a highway is provided. Exhaust emissions from individual motor vehicles are directed by means on the motor vehicle into receiving means distributed along the highway surface. The received exhaust emissions are passed to a centralized processing means which removes a pollutant thereby preventing air pollution.

---

This invention relates generally to an air pollution prevention system and apparatus and more particularly to a system and apparatus for processing and cleansing exhaust missions from motor vehicles to prevent air pollution.

As is well known, the largest percentage of air pollution is by obnoxious ingredients present in automobile exhaust emissions. Different proposed solutions have been presented which involve modifications of, and/or adjustments to internal combustion engines which tend to burn up the contaminant gases and/or provide for a more complete burning of fuel. However, even combined with exhaust control devices, the carbon monoxide emissions and hydrocarbons are not nearly all removed. If a more efficient system for removal of contaminant gases cost only one hundred dollers per vehicle and if ten million new motor vehicles were manufactured in a single year, then one billion dollars would be spent by the new car buyers in air pollution prevention devices for new motor vehicles alone in a single year. Even if every new car were required to have such an expensive air pollution prevention system, it would be a good many years before a substantial percentage of motor vehicles on the road had them so that an automobile air pollution prevention might become successful.

With the foregoing in mind, it is an object of this invention to provide an air pollution prevention system for motor vehicles travelling on highways which prevents the economic waste inherent in the above discussed known systems which are required to be carried by each individual motor vehicle.

It is another object of this invention to provide an air pollution prevention system and apparatus whereby selected contaminant gases in exhaust emissions of vehicles are prevented from being returned to the atmosphere without removal means for said selected gases being required to be carried by each individual motor vehicle.

It is a further object of this invention to provide an air pollution prevention system for motor vehicles travelling on highways which can be converted or modified to remove any particular pollutant or combination of pollutants with a minimum modification of the overall system.

It is another object of this invention to provide a simple apparatus for a motor vehicle which directs exhaust emissions into receiving means for these emissions which is embedded in the highway.

It is yet another object of this invention to provide receiving means for exhaust emissions embedded in the highway for the purpose of further processing and removing undesired ingredients thereof to prevent air pollution thereby.

In accordance with a preferred embodiment of the invention, exhaust emissions from individual motor vehicles are directed by means on the motor vehicles into receiving means distributed along the highway. The receiving means collects and passes the received exhaust emissions to a centralized processing means which may be arranged to remove a selected one or more pollutants, and return the remaining air and portion of unremoved exhaust emissions back into the atmosphere.

Other objects, features, applications and advantages of the present invention will become manifest to those versed in the art upon making reference to the detailed description which follows and the accompanying sheet of drawings in which a preferred form of air pollution prevention system and apparatus, by means of which the methods of the present invention may be practiced, is shown in an illustrative example.

In the drawings forming a part of this specification, and in which like numerals are employed to designate like parts throughout the same:

FIGURE 1 is a bottom view of a motor vehicle modified in accordance with one embodiment of the invention.

FIGURE 2 is an end view of the motor vehicle of FIGURE 1 and further showing a cross section of the highway to illustrate the collecting and processing of exhaust emissions in accordance with a further feature of the system.

FIGURE 3 is a top view of the highway shown in FIGURE 2 in order to more clearly show the distribution of the collecting and processing portions of the system. An arrangement or the system including a portion of a second lane is also shown.

FIGURE 4 is a partial sectional view of a tunnel having an alternate form of inlet with an end portion of the exhaust pipe extention thereabove.

Referring to FIGURE 1 there is shown a motor vehicle 1 having a muffler 2 which passes exhaust emissions through an exhaust pipe portion in the usual manner. In accordance with the embodiment of the invention shown in FIGURE 1, an extended pipe portion 6 is coupled to a portion of exhaust pipe extending from the muffler 2. The extended portion 6 may have a crossbar attached thereto. The crossbar extends parallel to the road surface and perpendicularly to the direction of travel along the highway. The crossbar can extend across the entire width of the vehicle but can be attached to or suspended from the vehicle in a similar position. The portion carries three devices capable of sensing a metal object under the vehicle and directly below each one of them. The devices may be magnetic sensing devices (or just metal detecting devices depending on the inlet grating material 23) which when saced apart will each indicate whether or not the inlet means or grating 23 is under a particular one or more of the sensing devices. A motor is mechanically coupled through positioning means to drive pipe portion 6. The positioning means may be controlled by the magnetic sensing devices to switch the direction of or move the pipe portion 6 so that its end portion 9 with outlet 10 remains over the inlet grating 23, depending upon which if any of the sensing devices are sensing the inlet grating 23.

Basically, the positioning means according to this suggested arrangement is merely a homing system for positioning which depends upon the direction or position in which the metal grating 23 is detected by a group of sensors placed in opposite directions from the pipe 6 in the two directions in which the pipe may be required to move for proper tracking with the grating 23. It should be understood that a single device would suffice to perform the required homing function, that is, if the positioning means caused the pipe portion 6 to continuously scan the roadbed under the vehicle for grating 23, then the single sensing device could switch the motor and positioning means off when grating 23 was detected. However, a plurality of devices would improve the quality of the system since outer devices away from the center device could be used to return and maintain the pipe portion 6 over the grating where there is slight deviations of grating 23 from the center device.

FIGURE 2 shows a cross section of one lane of the roadway showing the road surface 21 and the divider strip 16. The lane on the other side may be modified in acordance with the system of the present invention in a similar manner. The subsurface tunnel 11 along the highway has a grating 23 along the highway surface 21 through which exhaust emissions are directed. At the bottom of the subsurface tunnel 11 is draining means which has draining tubes 14 spaced at different points along the bottom of the tunnel 11 for preventing the accumulation of water in the subsurface tunnel. At different points along the subsurface tunnel 11 which runs along under the highway lane 21, there are side ducts 13 which may have suction fans 15 and 17 inserted therein and which lead to processing units 18 and 19. The central or main duct 11 which runs parallel to and under the lane of the highway may also have suction fans 15 positioned therealong. The suction fans are positioned along the collecting means or ductwork in such manner as to draw exhaust emissions which pass through the inlet grating 23 through the ductwork to the processing units 18 and 19. The number of suction fans and their power will depend upon the length of or section of central duct 11 which is serviced (the run of central duct 11 is shown to end at 12 in FIG. 3) and also upon the width of the intake grating 23 at the top of main duct 11 which in turn will depend upon the accuracy of the positioning system on the vehicles for directing their exhaust emissions into the inlet means 23. A more accurate positioning system will permit a narrower width of the grating 23 running along the highway surface, less power in the suction fans drawing the outside air and exhaust emiosions through the ductwork to the processing units, a higher ratio of exhaust emissions compared to outside air taken into the system through the inlet maens 23, and consequently result in a more efficient system. The number of fans and amount of suction necessary to draw the exhaust emissions from inlet 23 to the processing means 18 and 19 will also depend upon whether the main duct 11 in a second or further lane is also connected in parallel as shown in FIGURE 3. If it is not desired to incorporate sophisticated or accurate homing system or positioning means in the motor vehicle for insuring that the exhaust outlet 10 tracks over and directs exhaust emissions through the vent 23 during motion of the vehicle along the highway, then the vehicle may still be modified in rather simple fashion so that the system of the invention may be practiced, though with somewhat less efficiency. Means may be incorporated on the vehicle for directing the exhaust emissions fixedly towards the expected position of the inlet grating under the vehicle. The expected position of the inlet vent under the vehicle will depend upon the location of the inlet vent with respect to the land markers at each side of the lane, and the expected path of the vehicle with respect to the lane markers 16 and 22. However, in the above, simplest modification of the vehicle where the exhaust emissions are directed towards the average expected position of the inlet grating in the road surface under the vehicle, it would be desirable to widen the inlet vent 23 of the system to make more likely that the system would receive the exhaust emissions from vehicles modified in this simple fashion when these vehicles changed slightly their course with respect to the lane markers and inlet vent 23. Old vehicles presently using the highways and not having exhaust pollution prevention arrangements could be simply modified in the above manner by simply providing an extension 9 from the present exhaust pipe over to and down towards the location to the rear of and between the rear wheels of the vehicle where the inlet vent is expected to pass. The end portion of the pipe extension 9 carrying outlet 10 should be nearly flush with the grating and also somewhat flexible so as to absorb any shock should the end portion 9 carrying outlet 10 actually forcefully hit the inlet grating 23.

The crossbar is fixed to a mounting bracket extending from the bottom of the vehicle. The crossbar extends across the distance between the wheels (since the inlet vent will pass at some point between the wheels) and has a plurality of sensing means along its entire length. The crossbar is independently mounted from the pipe 6. Each sensing means when energized causes positioning means and motor to move the pipe extension 6 carrying outlet 10 to the same position as the particular sensing means energized, so that the outlet 10 is brought in any case over the vent 23. Each sensing means when energized, may control a switch which turns on the motor and gear train or positioning means to drive the pipe 6 to a position correspondingly under the particular energized sensing element.

In the embodiment of the system shown in FIGS. 2 and 3, a suction fan 17 is shown in the side ducts 13 which forces the exhaust emissions into processing means 18 and 19. Although two processing means 18 and 19 are shown, there may be one or more depending upon how much processing desired. Additional suction fans may be necessary between processing means 18 and 19 or thereafter depending upon the overall length and size of the ductwork required to service various lengths of highway. The processing units 18 and 19 may each be designed to efficiently remove a particular undesired ingredient of the exhaust emissions. For example, unit 18 may be a long extra large size catalytic muffler of known type using vanadium pentoxide which produces a high degree of control in removing hydrocarbons. Unit 19 may then remove the carbon monoxide by absorption therefrom by passing the exhaust emissions through an ammoniacal or hydrochloric acid solution of cuprous chloride as is done in gas analysis. A processing unit 18 or 19 could comprise an electrostatic precipitator, as a further example, which could be effectively used to recover particulate lead. The specific means used in processing units 18, and 19 if used, for removing a particular one or more undesired ingredients from a gas mixture thereof are known and form no part of the present invention, the three means described are given only by way of examples. More or less processing units may be incorporated into the system, and each processing unit may comprise any one of the several means known commercially for removing a particular ingredient from an air mixture thereof. A processing unit may be of the known type, for example, which removes certain combustion by products such as sulfur dioxide (as done by industrial sources in the reduction of air pollution).

An advantage of the present invention is that a centralized processing unit or units (such as 18 and 19 if more than one is used) may be used to remove undesired ingredients from the exhaust emissions of a very large number of vehicles a heavily travelled street of a large city. The centralized processing units of the system of the present invention and the suction fans could be turned on during the heavily travelled rush hour periods and turned off at other times. It should be recognized that the duct 11 could serve the dual function of passing exhaust emissions to the processing means 18 and 19 and further acting as part of a draining system for the highway if the drainage tubes 14 are made larger and arranged to pass only water off to the side of the highway for collection or disposal, and the highway surface is steeped toward said draining means. Certain products or byproducts removed by the processing units, depending upon the particular means used may be accumulated and be of commercial value. The system of the present invention using centralized processing units affords the use of bulkier known commercial or industrial type means for removing a particular gas from the exhaust emissions which are highly efficient when compared to the proposed lightweight compact processing units which must be carried by each vehicle in the known exhaust cleaning apparatus.

If the vent 23 were replaced by means which permitted only the passage in of exhaust emissions and no added air was therefore introduced, then such a closed system would result in greatly increased efficiency. Such means could be a vent 23, modified so that the exhaust blown from outlet 10 would pass through small tubes 27 into duct 11 when the pressure of the exhaust exceeded air pressure causing opening of the valves 28 (as shown in FIG. 4). The valves 28 could alternatively be caused to open by a sensing device in the tube 27 which detected an increased amount of one of the exhaust emission gases present as would occur when exhaust emissions of a vehicle were being directed into the tubes 27.

Modifications within the scope of the apparatus and system described will occur to those skilled in the art. The present invention is therefore not to be thought of as limited to the specific embodiments disclosed for illustrative purposes.

I claim:

1. A system for collecting and processing exhaust emissions from motor vehicles to prevent air pollution of the atmosphere surrounding said motor vehicles travelling on the surface of a lane of a highway which comprises: receiving means embedded in said highway and distributed therealong, said receiving means collecting and passing the received exhaust emissions to processing means, said receiving means including collecting means comprising a main duct (11) which runs parallel to and under said lane of said highway; inlet means comprising a grating (23) positioned at the top of main duct (11) and in said highway surface and substantially flush with the highway surface and running along the length of the highway for receiving exhaust emissions subsurface means including said duct (11) connected to said inlet means, said subsurface means including suction fans for leading said received exhaust emissions which pass through said grating (23) to processing means (18, 19), said processing means comprising purifying means positioned at the level of the highway connected to the subsurface means to purify the exhaust gases and return purified gas to the atmosphere.

2. The system of claim 1 wherein the purifying means comprises catalytic means.

3. The system of claim 1 wherein the purifying means comprises absorption means.

References Cited

UNITED STATES PATENTS

| | | | |
|---|---|---|---|
| 334,158 | 1/1886 | Beard | 55—220 |
| 434,165 | 8/1890 | Westinghouse | 55—385 |
| 1,224,448 | 5/1917 | Davidson | 94—33 |
| 1,385,447 | 7/1921 | Hamilton | 302—66 |
| 1,803,290 | 4/1931 | Adler | 94—1 |
| 2,026,498 | 12/1935 | Hohorst | 94—33 |
| 2,166,591 | 7/1939 | Hollister | 55—385 |
| 2,558,023 | 6/1951 | Walsh. | |
| 2,733,668 | 2/1956 | Pfetzing | 98—43 |
| 2,826,263 | 3/1958 | Stowe | 261—30 |
| 3,100,146 | 8/1963 | Huntington | 23—2.2 |
| 1,731,289 | 10/1929 | Blair | 98—49 |
| 2,358,868 | 9/1944 | Marx | 98—115 |
| 3,242,844 | 3/1966 | Smith | 98—1 |
| 3,211,167 | 10/1965 | Clift et al. | 210—170 |
| 3,299,620 | 1/1967 | Hollingworth | 55—472 |

FOREIGN PATENTS

| | | |
|---|---|---|
| 1,205,920 | 11/1965 | Germany. |
| 759,964 | 10/1956 | Great Britain. |

HARRY B. THORNTON, Primary Examiner

B. NOZICK, Assistant Examiner

U.S. Cl. X.R.

4—219; 23—2, 288; 55—473, 420; 60—29; 94—33; 98—1, 49; 180—64

UNITED STATES PATENT OFFICE
CERTIFICATE OF CORRECTION

Patent No. 3,503,188                          March 31, 1970

Conrad O. Gardner

It is certified that error appears in the above identified patent and that said Letters Patent are hereby corrected as shown below:

In the heading to the printed specification, line 5, "1329 N. W. 20th St." should read -- 1329 N. W. 200th St. --.

Signed and sealed this 24th day of November 1970.

(SEAL)
Attest:

Edward M. Fletcher, Jr.                          WILLIAM E. SCHUYLER, JR.
Attesting Officer                                      Commissioner of Patents